Sept. 7, 1965  L. L. RYDEEN  3,204,630
ICE FISHING DEVICE
Filed Feb. 18, 1963

INVENTOR
LEWIS L. RYDEEN
BY
ATTORNEY

United States Patent Office
3,204,630
Patented Sept. 7, 1965

1

3,204,630
ICE FISHING DEVICE
Lewis L. Rydeen, R.F.D. 2, Stillwater, Minn.
Filed Feb. 18, 1963, Ser. No. 259,015
6 Claims. (Cl. 126—360)

This invention relates to an ice fishing device particularly adapted to enable the fisherman to free a hole of ice and to be readily insertable and removable from the ice hole as desired, the device being intended to enable a fisherman who has left a fishing hole for a period of time to remove the ice which refroze in the hole readily.

In many Northern States and wherever the ice on lakes or streams freezes thick enough to support the weight of fishermen and cars, ice fishing has become an exceedingly popular outdoor sport.

Generally, a hole is drilled or chopped through the ice by means of an ice chisel, power auger, etc. While fishing, the angler generally keeps ice from forming within the fish hole opening by means of a scoop or by use of his hand. As the ice forms, the fisherman scoops it from the hole. When the angler leaves the hole for a lengthy period of time, particularly during very frigid weather, the ice soon forms within the hole and gradually thickens so that upon the angler's return he must once again chop ice in order to clear the hole.

Many times the angler may be gone for several hours or even for several days. On those occasions, the ice will have closed the hole completely requiring tedious reopening of the hole. Where a fisherman has had a good catch in a particular location, he generally prefers to continue fishing in that location. However, each time it is necessary to reopen the hole in the ice.

Many fishermen prefer to use ice houses, or other similar protective devices in order to protect themselves from the wind and freezing weather. Since these ice houses are generally moved about on the ice by tractor or by pulling with the car, the fisherman having found a good fishing location generally prefers not to move the fish house. However, each time the fisherman uses the house in freezing weather it is necessary to reopen the hole which has frozen over.

It is an object of the present device to provide an ice fishing device adapted to be inserted into the fishing hole, the device being hollow and of sufficient diameter so as to provide a large enough opening through which fish may be readily withdrawn and of sufficient length to be usable when the ice has become quite thick.

Preferably the device is cylindrical and comprises a pair of hollow walled sleeves in telescoped relation, a layer of suitable insulation coextending between the two hollow sleeves. The sleeves and intermediate insulation together provide a structural casing. In order to prevent the casing from sliding through the hole in the ice, the casing has a support member which is secured so as to extend laterally outwardly of the outer sleeve at one end of the casing.

In preferred construction, the support member is secured to the upper outer surface of the outer sleeve and is in the form of a plate having a collar encircling and secured to the sleeve. It is obvious, of course, that other means of support would perform a similar supporting function such as arms, etc. The plate overlies the ice surrounding the hole through which the fishing hole device extends to hold the device in the desired position.

The casing tapers in diameter from the portion supported at the top to the lower end portion which extends into the ice. The taper is provided in order to enable the device to be more readily removed from the surrounding ice which encloses it. The largest diameter of the casing is at the end to which the support member is secured, the casing tapering gradually to its lowest point. In preferred construction the device is of sheet metal so as to be economical in manufacture and to enable the device to readily transmit heat.

Each hollow sleeve is designed to be heated selectively to melt ice adjacent to the particular sleeve. As ice surrounding the outer sleeve is melted, the entire casing may be removed from the hole. As ice within the confines of the inner sleeve is melted, the ice may be removed as a core from within the confines of the inner sleeve. To enable the fisherman to more easily remove the ice as a core, preferably a float means such as a wooden block is secured by means of a line and appropriate fastening means to the casing at the supported end of the device. The block is permitted to float in the open water when the fisherman leaves the device, the purpose being to permit the block to freeze into the ice which forms within the confines of the inner sleeve. As will be understood, during normal fishing the device does not require that the block be permitted to float within the confines of the inner sleeve. It is only when a fisherman desires to leave his device for a period of time that he will normally place the block in floating position within the confines of the hollow walled inner sleeve on the surface of the water so that should ice form the block will be frozen in to the ice. When the fisherman returns and wishes to use the hole again, the ice adjacent to the inner sleeve is melted away from the surface of the sleeve by heating the sleeve by gas operated means. As the ice adjacent to the sleeve is melted, the fisherman may readily remove the ice by grasping the float and removing the ice as a core.

It is an object of the present device to provide a casing having a pair of hollow telescoped cylindrical sleeves separated from each other by a wall of insulation, the sleeves being selectively heated in order to melt ice adjacent to the exposed surface of the selected sleeve.

Connecting heating outlets for engagement with the heating means are provided for each hollow walled sleeve. The connecting outlet includes an elongated tube extending to near the base within the walls of the hollow sleeve. As heat is directed into the connecting outlet, the heat travels through the heat conducting tube to a point adjacent the end of the sleeve, and then rises towards an exhaust outlet in the supported end of the sleeve.

It is an object of the present invention to provide a selective gas heated sleeve having conductor tube means to direct the heat so as to disperse the heat uniformly throughout the sleeve in order to melt ice adjacent to the exposed surface of the sleeve.

It is a further object to provide a fishing device to fit into an ice fishing hole, the device being tapered so as to be readily removed from the enclosing ice. It is a further object to provide an ice fishing device to be placed in an ice fishing hole which is durable, not subject to damage by freezing, economical to manufacture, and simple and efficient to operate.

It is apparent the fisherman would insert the device into a fishing hole, the device being supported in desired position in the hole by a collar plate resting on the surface of the ice. Normally, the device would be frozen into position by the surrounding ice. Should the fisherman desire to remove the device from its icebound position, he merely heats the outer sleeve until the ice adjacent the sleeve melts and the device may be readily lifted from its hole. It will be obvious that the tapered structure will easily free itself of ice and be readily removable as the ice melts. The ice which forms within the confines of the inner shell is readily removed by heating the inner shell and removing the ice as a core by grasping the block means frozen into the ice.

These and other objects, particular advantages, and details of structure of the invention will be more fully described in the following specification taken in conjunction with the accompanying drawings in which.

Figure 1:
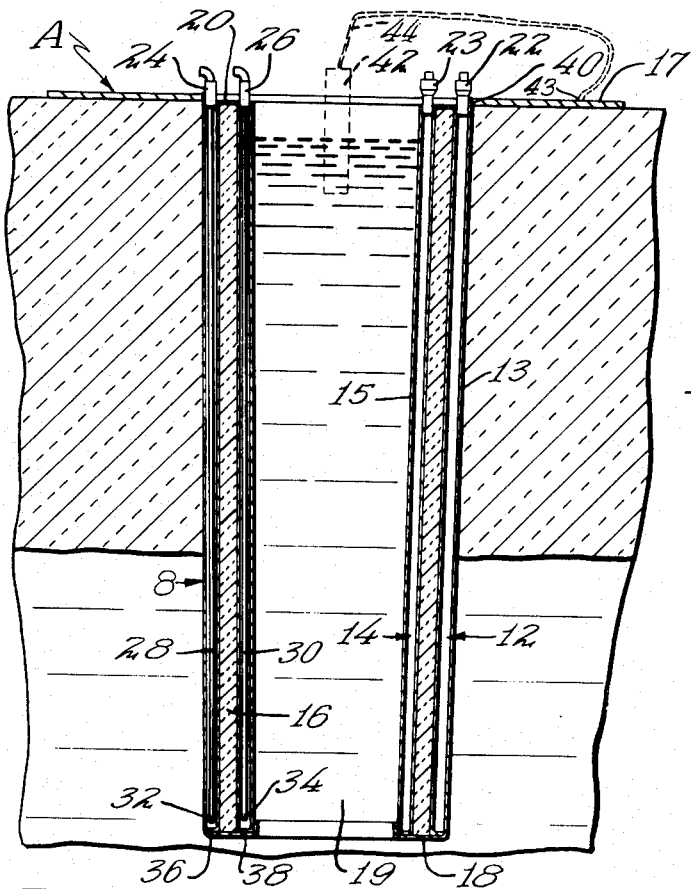
FIGURE 1 is a longitudinal section through a gas heated device showing the relation of the parts of the invention to each other and the surrounding medium in which the device is used.
Figure 2:
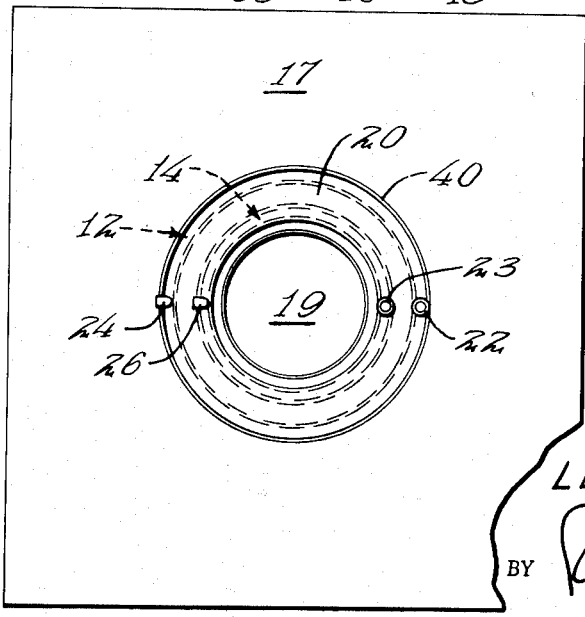
FIGURE 2 is a top plan view of the device of FIGURE 1.

FIGURE 1 discloses a fishing device designed to be inserted into an ice fishing hole, the device being generally lettered A.

The device A is intended to provide means whereby an ice fisherman may obtain a clean uniform sized fishing hole throughout the ice fishing season without the necessity of chopping or drilling the ice on each occasion that he wishes to fish. The device is intended to be inserted into a hole and to be left in the hole as long as the fisherman desires. Should the fisherman desire to remove the device from the hole, the outer sleeve of the device is heated causing ice adjacent to the exposed outer surface of the device to melt thereby freeiing the device and enabling it to be easily removed. The device A provides an inner aperture to serve as a fishing hole confined within the device, and should this hole freeze over, the fisherman may remove the ice by heating the surface of the device adjacent to the ice and removing the ice as a plug or core.

As will be understood, ice readily forms during frigid weather whenever an opening occurs in the surface of the ice. In order to keep the hole open, the fisherman generally scoops out the ice as it forms in the hole. However, if the hole is left for a period of time, ice forms and the fisherman must chop the ice from the hole in order to close it.

The fishing device A includes a hollow tubular casing 8 adapted to be inserted into a hole which has been opened in the ice, and to be held in a particular position during the time it remains in the hole, the device having a sufficiently large opening so that large fish may be pulled through the hole.

The device A casing 8 shown in FIGURE 1 is composed of a pair of hollow walled generally cylindrical sleeves in telescoped relation, the sleeves being numbered 12 and 14. The hollow walled sleeves form a receptacle for heat whereby ice adjacent an exposed surface of the sleeves is melted by heat conducted from the sleeve interior. In preferred construction the sleeves 12 and 14 are cylindrical although other shapes such as rectangular, conical, and the like would be satisfactory.

The hollow cylindrical sleeves are telescoped together, the telescoped sleeves 12 and 14 being separated and insulated from each other by a layer of insulation 16 such as fibre glass and the like. The sleeves 12 and 14 are held in spaced relationship to the insulating material being sealed from the moisture and atmosphere by a pair of sealing members 18 and 20 which may be integral with the ends of the spaced sleeves 12 and 14.

Each cylindrical hollow walled sleeve 12, 14 is of sufficient length so as to be usable when the ice is quite thick. I have found that a length of approximately thirty inches is sufficiently long to be used in most winter climates. In the event that longer or shorter devices are required, the principle given for the preferred model will apply.

The sleeves 12, 14 forming the casing 8 are preferably made of a material sufficiently strong so as not to be easily damaged by being dropped or carried loosely in a car trunk, and to be relatively free from warping although subjected to extremes in temperature. The device A is subjected to temperatures between freezing and temperatures required to melt ice adjacent to the exposed surface of the sleeves, and is subjected to some pressure by the ice in which it is embedded. The device A transmits heat from the heating unit into the interior of the walled sleeves 12 and 14 where the heat is conducted to the adjacent ice in contact with the sleeves so as to cause the ice in contact with the sleeve to melt along the exposed surfaces, 13, 15 of the sleeves 12, 14.

The heated fishing device A shown in FIGURE 1 has a pair of exhaust valve outlets such as vents 22 and 23 and heating connections 24 and 26 which will be further described provided for the telescoped sleeves 12 and 14, each hollow walled sleeve having at least one heating connection and one vent opening.

I have found that sheet metal is highly suitable for the device, but other materials which are unaffected by changes in temperature, are durable, capable of conducting heat readily, and readily manufacturable to the desired shape are satisfactory. The preferred construction of the gas heated device A of FIGURE 1 includes a tapered inner hollow walled sleeve 14 and a conformably tapered hollow walled outer sleeve 12, the sleeves 12 and 14 being hollow, preferably cylindrical, and having walls enclosing a heat chamber, the chamber being sealed to the atmosphere except for the heating connections 24, 26 and vent openings 22, 23. The telescope sleeves 12 and 14 are separated by a layer of insulation. In preferred construction each sleeves is approximately one-half inch thick, the walls of the sleeve enclosing the said heat chamber.

The hollow sleeves 12 and 14 forming the casing 8 are secured to a plate 17 of sheet metal or other suitable material, the plate 17 being adapted to reside on the surface of the ice adjacent to the hole where the device is not used by a fisherman utilizing a fish house. Where a fisherman uses a fish house, the plate 17 is adapted to rest smoothly upon the fish house floor, with the sleeves inserted into the hole in the ice. As will be readily understood, an opening 19 extends longitudinally within the confines of the inner sleeve 14 through which the fisherman drops his line.

The plate 17 is secured to the sleeves 12 and 14 at one end of the sleeve so as to extend laterally outward from the sleeves. An aperture registrable with the opening 19 of the sleeve extends through the plate 17. The plate 17 provides a support means to hold the sleeves 12 and 14 in desired position in the fish hole. It is readily apparent that other support means such as arms would prove satisfactory for supporting the sleeves inserted in the hole in the ice.

The sleeves 12 and 14 are tapered in diameter from the ends of the sleeves engaged by the support plate 17 to the other end of the sleeves. I have found that the following dimensions are satisfactory for the sizes of fish caught by most fishermen, the inside diameter of the inner sleeve at the supported end being seven inches and tapering to an inner diameter of six inches at the other end of the sleeve. The insulation 16 and outer sleeve 12 overlying the inner sleeve 14 are similarly tapered from the supported end of the structure to the end inserted into the hole in the ice.

Each sleeve 12, 14 has heat connection means 24, 26, and exhaust vent openings 22, 23. Each sleeve 12, 14 may be selectively heated by a gas heating open flame torch (not shown) such as a propane torch which is connected to a selected heat connection so as to direct heat from the torch into the interior of the sleeve. A heat conducting tube means 28, 30 is provided as an extension from the connections 24, 26, the heat conductor tube being a pipe, conduit, or other suitable ducting extending longitudinally between the enclosing walls of the hollow sleeve to a point 32, 34 adjacent the base 36, 38 of the hollow sleeves. The tubes 28, 30 may be connected to the connectors 24, 26 by any suitable means such as by soldering, welding, and as a one-piece unit if desired with the top plate 17 and the hollow walled sleeves.

As is apparent from the drawings, the heat connections 24, 26 are connected with the ducts 28, 30 and extend through the plate 17 into the space within the hollow wall sleeves 12 and 14. In preferred construction the plate 17 includes a collar means 40 encircling the aperture in the plate aligned with the openings 19 of the inner sleeve, the collar 40 which may be a coplanar portion of the plate being secured to the sleeves 12 and 14 in any suitable way such as by soldering, etc. As previously pointed out, the plate 17 is a support for the sleeves 12 and 14 inserted into the hole in the ice, and various satisfactory ways of engaging the plate 17 to the sleeves 12 and 14 are available, the preferred method being from the sleeves to be spot welded.

A float means 42 which in preferred construction is a wooden block which has a cord 44 or other suitable line attached to the block 42 is secured to the plate 17. A fisherman upon finishing fishing, places the block means 42 into the opening 19. As the water within the opening 19 freezes, the block 42 is frozen into the ice. The fisherman upon his return connects the heating unit with the connector 26 to heat the inner sleeve 14. When the ice confined within the exposed surface of the inner sleeve 14 melts, the fisherman grasps the float 42 and removes the ice as a core from the device, thereby reopening the fish hole for fishing.

It has been found that the float 42 enables the fisherman to readily remove the ice after the ice in contact with the exposed surface of the sleeve has melted. The float 42 may be secured to the plate 17 as indicated at 43 or to the casing composed of the hollow walled sleeve 12 and 14 depending upon the means employed to support the sleeve within the fish hole.

It has been found that a fisherman returning to his fishing hole and desiring to remove the ice confined within the inner sleeve or desiring to remove the fishing device from the hole may secure a sufficient melting of the ice adjacent the selected exposed sleeve surface within a period of approximately three minutes so as to enable the fisherman either to remove the device from the hole or to remove the core of ice from within the inner sleeve confines.

I have found that the dual sleeved device is very satisfactory for the intended purpose, the insulation between the sleeves reducing the heat loss and enabling the selected sleeve to function more effectively than one sleeve alone.

In accordance with the patent statutes, the principles of construtcion and operation of this improvement in ice fishing device have been described, and while an endeavor has been made to set forth the best embodiments thereof, it should be understood that changes may be made within the scope of the following claims without departing from the spirit of the invention.

I claim:

1. An ice fishing device for freeing an ice-fishing hole of ice comprising in combination:
   (a) an elongated generally cylindrical casing adapted to be inserted into an ice fishing hole, with its axis generally vertical,
   (b) support means extending laterally from one end of said casing adapted to reside on the surface of ice surrounding the hole to hold said casing in desired position,
   (c) said casing including an innner hollow walled sleeve and an outer hollow walled sleeve and insulation means between said sleeves, at least the lower ends of said hollow walled sleeves being closed,
   (d) heat conductor conduit means positioned between the walls of each said hollow walled sleeve, extending from the top thereof to a point near the bottom thereof,
   (e) a heating unit selectively connected to said heating conductor means to direct heated gas through said conduit means,
   (f) said casing being tapered, the greatest dimension being at said one end,
   (g) whereby when the temperature of one said sleeve is raised above freezing, ice adjacent said one sleeve is melted away from engagement with the surface of said sleeve.

2. The structure of claim 1 and which includes a float means adapted to float within said casing to freeze into the ice forming within said casing whereby when the ice adjacent the inner sleeve is melted, said ice remaining in said sleeve may be removed as a core by grasping said float means.

3. The structure of claim 1 and in which said heating unit includes a gas torch.

4. An ice fishing device adapted to be inserted into a hole in the ice for freeing the ice fishing hole of ice comprising in combination:
   (a) an elongated generally cylindrical casing having an inner hollow walled sleeve and an otuer hollow walled sleeve and insulation means coextending between said sleeves, said sleeves and insulation being in substantially concentric relation,
   (b) support means including a collar plate extending outwardly from one end of said casing adapted to reside on the surface of ice surrounding the hole to hold said casing in desired position,
   (c) the ends of said hollow sleeves being closed,
   (d) a heat conductor including a tube means extending through said one end of said casing between the walls in each said hollow walled sleeve to a point adjacent the other end of said sleeve,
   (e) each said sleeve including an exhaust outlet at said one end,
   (f) a gas torch selectively connected to a said tube externally of said casing,
   (g) whereby when said torch is ignited, heat from said torch passes through said tube to said other end and reverses to heat said selected sleeve before exhausting.

5. The structure of claim 4 and which includes a float means including a handle block, a line secured to said block and to said casing, said block adapted to be placed in the opening defined by said inner sleeve to freeze into the ice which forms within the opening defined by said inner sleeve, whereby when said ice adjacent the surface of said sleeve is melted, the ice may be removed as a core by grasping said float means.

6. An ice fishing device for freeing an ice-fishing hole of ice comprising in combination:
   (a) an elongated generally cylindrical casing adapted to be inserted into an ice fishing hole with its axis generally vertical,
   (b) support means extending laterally from one end of said casing adapted to reside on the surface of ice surrounding the hole to hold said casing in desired position,
   (c) said casing including an inner hollow walled sleeve and an outer hollow walled sleeve, arranged in concentric relation and having closed ends,
   (d) heat conductor conduit means extending through said closed ends of each of said sleeves and extending to a point near the other ends thereof,
   (e) the ends of said heat conductor conduit means externally of said sleeves each being adapted to accommodate a torch type heater,
   (f) whereby heated gas may be directed through said heat conductor conduit means to the interior of either of said sleeves to heat ice contacting either the outer surface of the outer sleeve or the inner surface of the inner sleeve.

References Cited by the Examiner

UNITED STATES PATENTS

| | | | |
|---|---|---|---|
| 1,180,266 | 4/16 | Maynard | 126—360 |
| 2,541,328 | 2/51 | Boklep | 126—360 |
| 2,774,856 | 12/56 | Paulsen et al. | 126—360 X |
| 2,883,784 | 4/59 | Obernolte | 126—360 X |
| 2,990,829 | 7/61 | McDonough et al. | 126—271.2 |

JAMES W. WESTHAVER, *Primary Examiner.*

FREDERICK L. MATTESON, JR., *Examiner.*